(12) United States Patent
Juranek (10) Patent No.: US 8,480,339 B1
(45) Date of Patent: Jul. 9, 2013

(54) TRIM COPING APPARATUS

(76) Inventor: Thomas L. Juranek, Harrisburg, SD (US)

( * ) Notice: Subject to any disclaimer, the term of this patent is extended or adjusted under 35 U.S.C. 154(b) by 296 days.

(21) Appl. No.: 12/963,269

(22) Filed: Dec. 8, 2010

(51) Int. Cl.
*B23C 1/16* (2006.01)

(52) U.S. Cl.
USPC ............... 409/92; 409/124; 409/130; 83/565; 144/144.1

(58) Field of Classification Search
USPC ................ 83/471.2, 869, 375, 391, 743, 776, 83/779, 780, 565, 781, 452, 467.1, 468, 468.1, 83/468.2, 468.4, 468.7, 483, 485, 487, 522.11, 83/522.15–522.17, 522.22, 821, 859; 144/2.1, 144/4.7, 1.1, 41, 144.1, 372; 409/93, 92, 409/124, 130, 125, 126; 451/237, 281
See application file for complete search history.

(56) References Cited

U.S. PATENT DOCUMENTS

| | | | |
|---|---|---|---|
| 3,442,309 A * | 5/1969 | Jentsch | 144/144.1 |
| 4,079,648 A | 3/1978 | Chappell | |
| 4,763,703 A | 8/1988 | Fromm | |
| 4,909,111 A | 3/1990 | Noble | |
| 5,090,283 A | 2/1992 | Noble | |
| 5,363,732 A * | 11/1994 | Heasley | 83/471.2 |
| 6,006,641 A * | 12/1999 | Fletcher | 83/471.3 |
| 6,095,726 A * | 8/2000 | Scott et al. | 409/92 |
| 6,142,199 A * | 11/2000 | Schibline | 144/363 |
| 6,854,372 B2 | 2/2005 | Anthony | |
| 6,877,238 B2 | 4/2005 | Kanaga | |
| 7,111,537 B2 | 9/2006 | Vallone | |
| 7,159,498 B2 | 1/2007 | Stewart | |
| 2003/0190202 A1 * | 10/2003 | Scott et al. | 409/92 |
| 2003/0221531 A1 | 12/2003 | Anthony | |
| 2005/0109181 A1 | 5/2005 | Zawadzki | |

* cited by examiner

*Primary Examiner* — Phong Nguyen (57) ABSTRACT

A trim coping apparatus includes a support frame having an upper support and a plurality of legs attached thereto. A cutting assembly includes a saw blade and motor for rotating the saw blade. A panel is mounted to the support frame. The panel has a planar upper surface and the saw blade extends above and below the upper surface. The panel and the cutting assembly are movable with respect to each other to allow a portion of wall trim extending over an edge of the panel to be cut by the saw blade. A control guide is in communication with the panel and is configured to follow contouring on a face of a piece of guide trim to restrict movement of the panel and the cutting assembly with respect to each other to allow the cutting assembly to cope an ending of the piece of wall trim.

18 Claims, 9 Drawing Sheets

TRIM COPING APPARATUS

BACKGROUND OF THE DISCLOSURE

1. Field of the Disclosure

The disclosure relates to wood shaping devices and more particularly pertains to a new wood shaping device particularly well suited for coping the end of trim to allow two pieces of trim, coming together at an angle, to be abutted against each other in a flush manner.

2. Summary of the Disclosure

An embodiment of the disclosure meets the needs presented above by generally comprising a support frame having an upper support and a plurality of legs attached to and extending downwardly from the upper support. A cutting assembly includes a saw blade and motor for rotating the saw blade. A panel is mounted to the support frame. The panel has a planar upper surface and the saw blade extends above and below the upper surface. The panel and the cutting assembly are movable with respect to each other to allow a portion of wall trim extending over an edge of the panel to be cut by the saw blade. A control guide is in communication with the panel and is configured to follow contouring on a face of a piece of guide trim to restrict movement of the panel and the cutting assembly with respect to each other to allow the cutting assembly to cope an ending of the piece of wall trim.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 10 thereof, a new wood shaping device embodying the principles and concepts of an embodiment of the disclosure and generally designated by the reference numeral 10 will be described.

Figure 1:
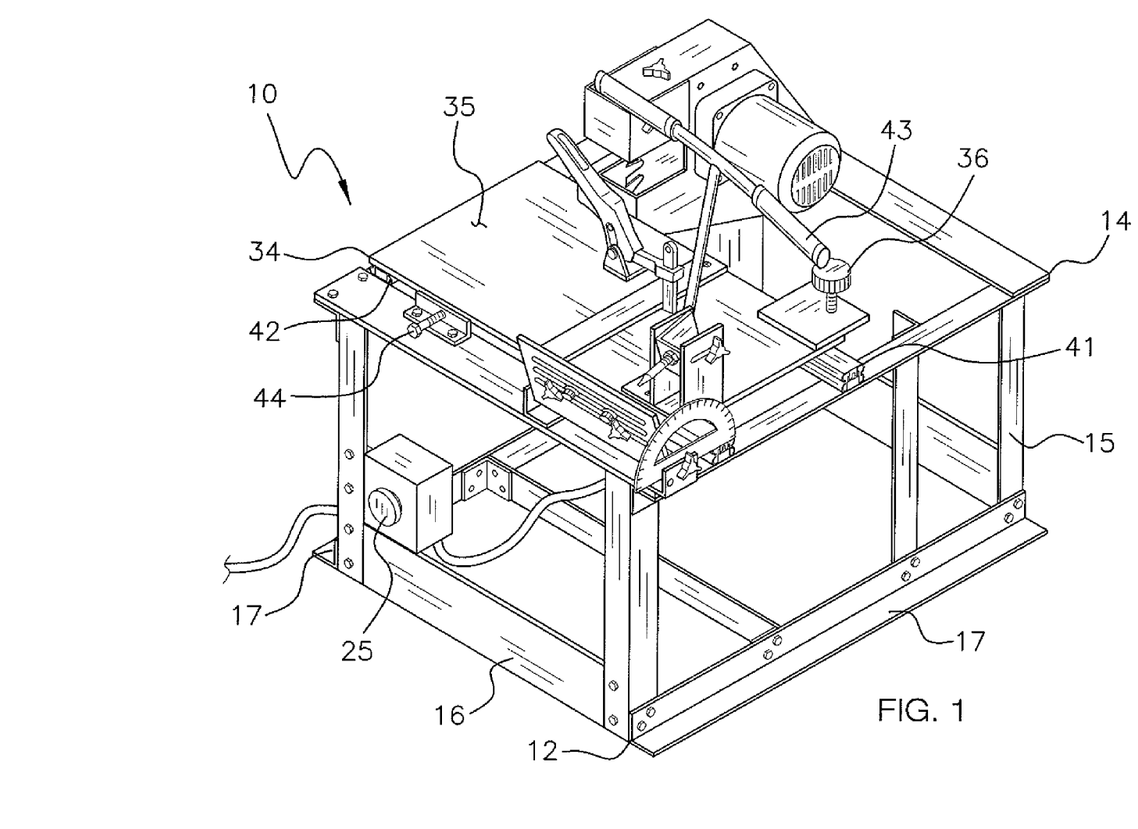
FIG. 1 is a top perspective view of a trim coping apparatus according to an embodiment of the disclosure.
Figure 2:
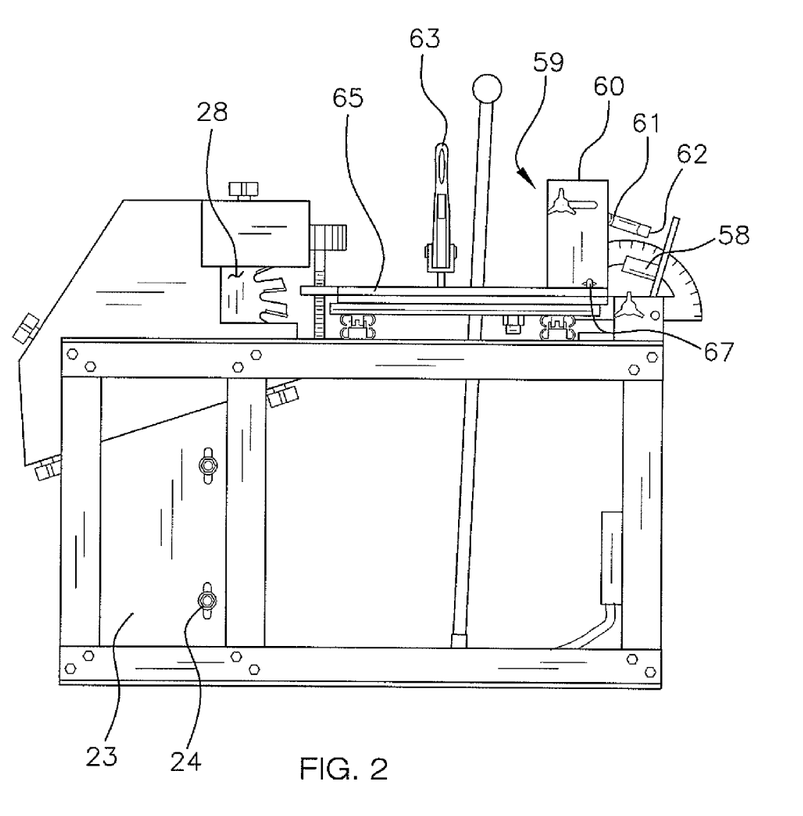
FIG. 2 is a right side view of an embodiment of the disclosure.
Figure 3:
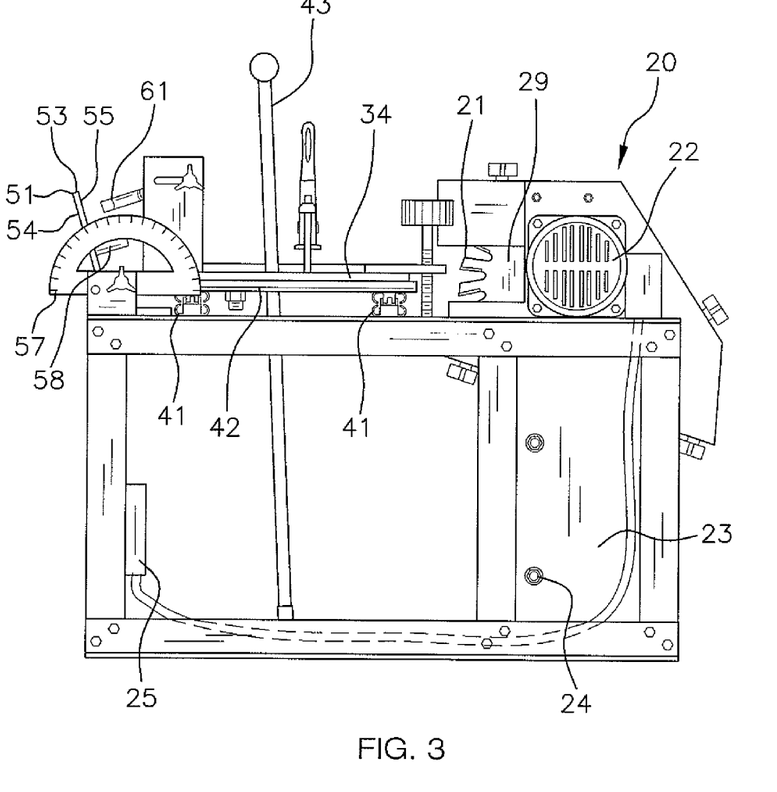
FIG. 3 is a left side view of an embodiment of the disclosure.
Figure 4:
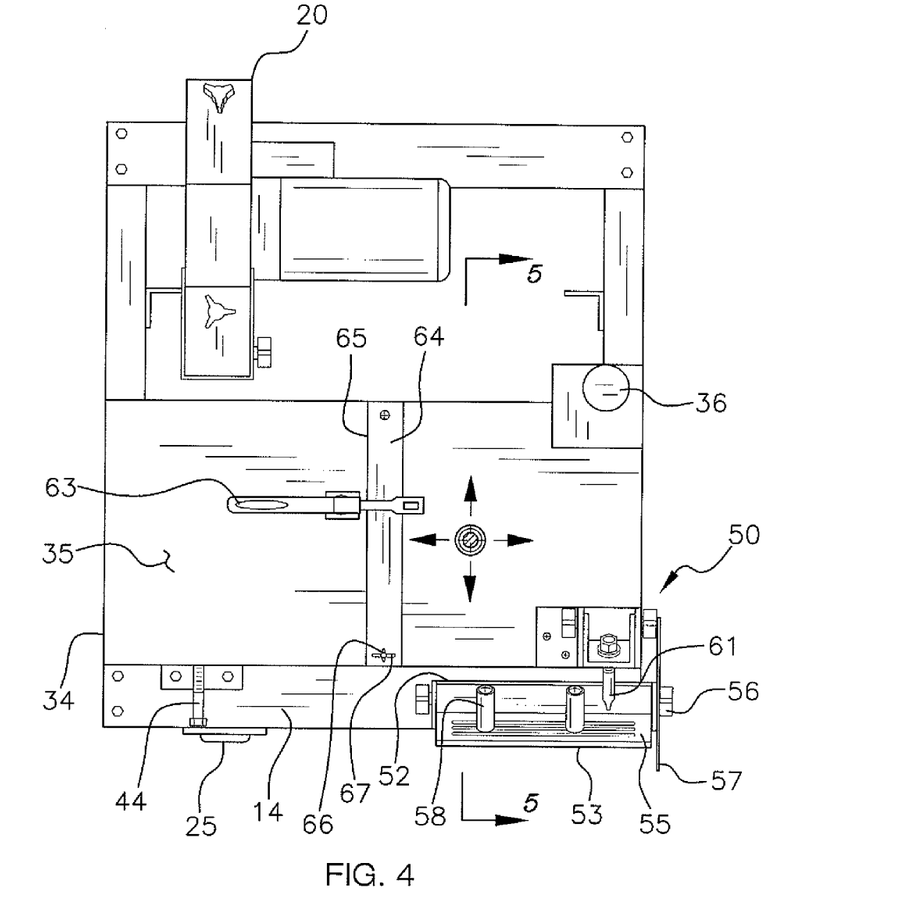
FIG. 4 is a top view of an embodiment of the disclosure.

As best illustrated in FIGS. 1 through 10, the trim coping apparatus 10 generally comprises a support frame 12 that includes an upper support 14 and a plurality of legs 15 that are attached to and extend downwardly from the upper support 14. As can be seen in FIG. 1, the support frame 12 may include bracing members 16 extending between the legs 15 as well as lateral supports 17 for stabilizing the support frame 12. It should be understood that any conventional support structure used for cutting operations may be utilized.

A cutting assembly 20 is provided which includes a saw blade 21 and motor 22 for rotating the saw blade 21. The saw blade 21 is a circular saw blade. The cutting assembly 20 is mounted on the frame 12 and may be configured to be raised or lowered with respect to the upper support 14. This is accomplished by slidably mounting the cutting assembly 20 to support brackets 23 that include fasteners 24 for lifting or lowering the cutting assembly 20 with respect to the support brackets 23. The cutting assembly 20 is electrically powered and generally comprises a conventional electric saw with an actuator 25 electrically coupled to the cutting assembly 20 for selectively turning the cutting assembly 20 on or off.

Figure 6:
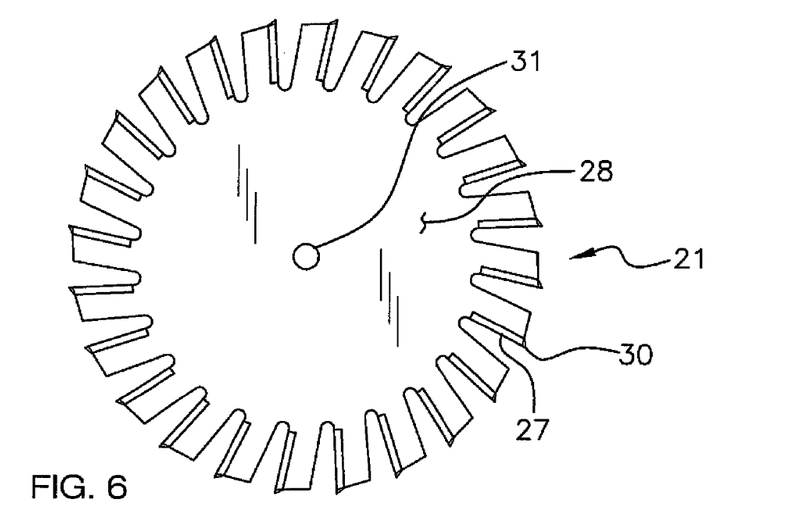
FIG. 6 is a side view of an embodiment of a saw blade of the disclosure.
Figure 7:
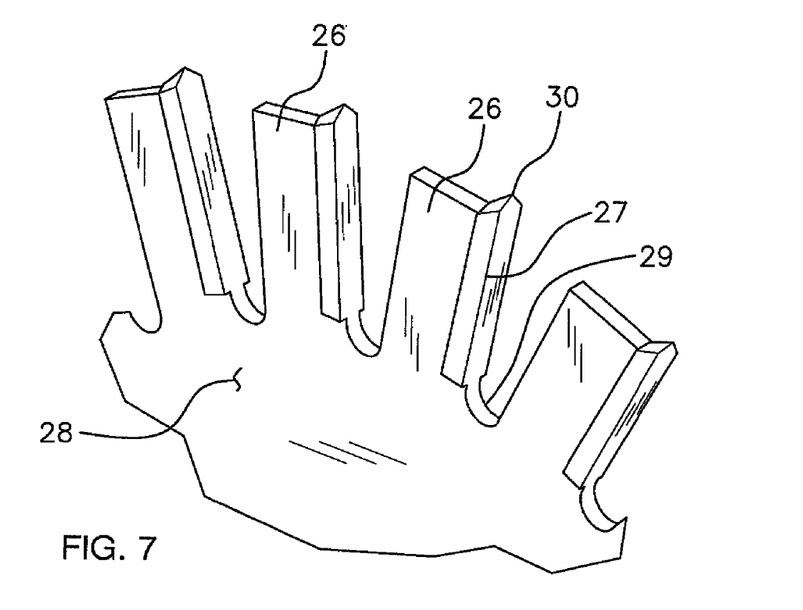
FIG. 7 is a partial perspective view of the saw blade of an embodiment of the disclosure.
Figure 8:
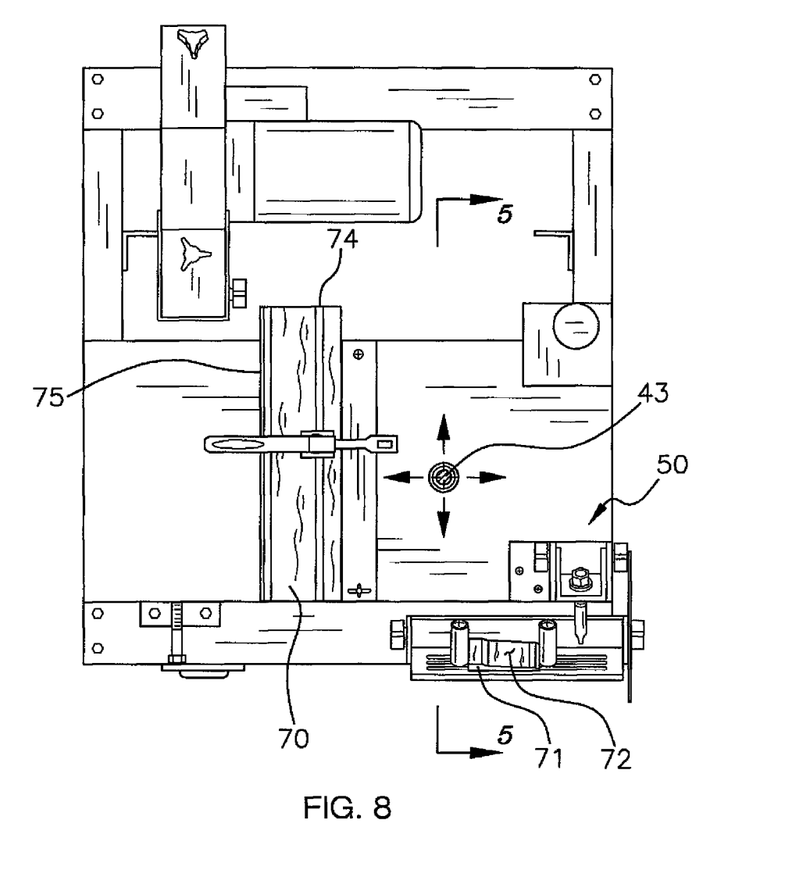
FIG. 8 is a top in-use view of an embodiment of the disclosure, having a portion of a handle removed for clarity.
Figure 10:
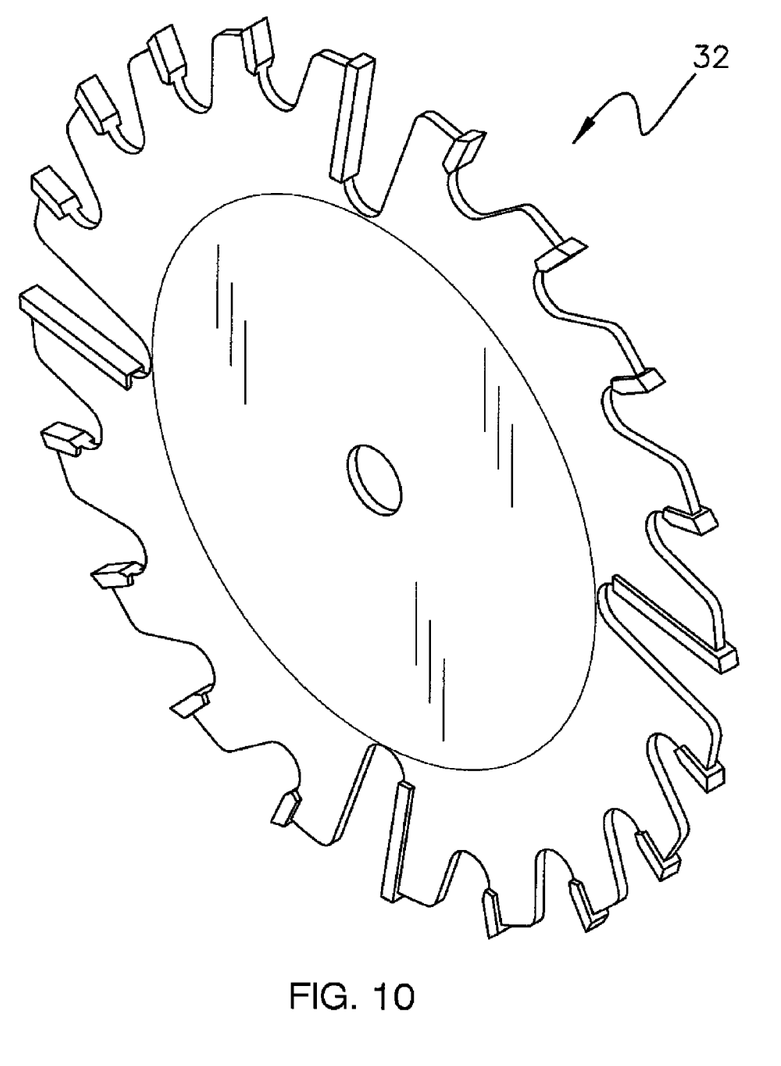
FIG. 10 is a partial perspective view of a saw blade of an embodiment of the disclosure.

While a conventional circular saw blade assembly may be used on some trims, particularly those that have no rounded areas, a modified saw blade 21, shown in FIGS. 6, 7 and 10 may be employed. This type of saw blade 21 will include conventional shoulders 26, however this saw blade 21 will include teeth 27 extending outwardly laterally from planes of a pair of opposed faces 28 of the saw blade 21. As shown in the Figures, the teeth 27 may be positioned on the shoulders 26 and extend not only laterally away but forward outwardly from the shoulders 26 as well. This allows the saw blade 21 to cut in three directions including opposed lateral directions and forward. It should be understood that these teeth 27 may further be mounted on the opposed faces 28, 29 themselves. The teeth 27, if mounted on the shoulders 26, will typically have a width that tapers inwardly from an outer end 30 thereof toward a center 31 of the saw blade 21. This will prevent jamming of the teeth 27 if they are used to cut wood in a conventional manner. However, this particular configuration of teeth 27 extending laterally from the saw blade 21 is particularly effective for the current apparatus 10 to allow wall trim to be coped laterally as wall trim 70 is brought laterally into the face 28 or 29 of the saw blade 21. The teeth 27 will typically have a length extending from the center 31 to an outer end thereof greater than 1.25 cm. FIG. 10 provides another modified blade 32 having areas including shoulders 26 of greater lengths. Such a blade 32 would be particularly useful as a framing blade.

A panel 34 is mounted to the support frame 12. The panel 34 has a planar upper surface 35. The saw blade 21 extends above and below the upper surface 35. The panel 34 and the cutting assembly 20 are movable with respect to each other to allow a portion of the wall trim 70 extending over an edge of the panel 34 to be cut by the saw blade 21. While the saw blade 21 may be tilted with respect to the panel 34, typically the saw blade 21 will have an axis of rotation orientated parallel to a plane of the upper surface 35. A table lock 36 may be mounted on the panel 34 to selectively lock the panel 34 in place. Discussed below is a mounting 40 for allowing movement of the panel 34 in which the cutting assembly 20 is relatively fixed, in comparison to the panel 34. However, it should be understood that this arrangement could be reversed such that the cutting assembly 20 is movable while the panel 34 is relatively fixed.

The mounting 40 couples the panel 34 to the upper support 14. The mounting 40 allows movement of panel 34 toward or away from the cutting assembly 20 to define an x-movement and laterally left or right of the cutting assembly 20 to define a y-movement. The ability to move the panel 34 in both the x and y axes allows the user to control the precise positioning of the wall trim 70 with respect to the saw blade 21. The mounting 40 includes a first rail assembly 41 and a second rail assembly 42 coupled together and positioned between and being attached to the upper support 14 and the panel 34. The first 41 and second 42 rail assemblies are orientated perpendicular to each other. One of the first 41 and second 42 rail assemblies allows the x-movement of the panel 34 and one of the first 41 and second 42 rail assemblies allows the y-movement of the panel. While the first 41 and second 42 rail assemblies could be alternately positioned, the Figures show the first rail assembly 41 being attached to the upper support 14 and the second rail 42 assemblies being attached to the panel 34. The first 41 and second 42 rail assemblies may include two rails as shown in the Figures though any number may be used.

A handle 43 engages the panel 34 to facilitate movement of the panel 34 with respect to the cutting assembly 20. As can be seen in the Figures, the handle 43 may be pivotally mounted to a brace 18 extending under the panel 34 and attached to the frame 12. This allows for more precise and steady movements of the panel 34. The handle 43 will be allowed to pivot 360° with respect to the brace 18. A tensioning bolt 44 or other similar structure may be mounted on the frame 12 or the panel 34 to selectively engage the first 41 or second 42 rail assemblies to prevent the panel 34 from moving too freely with respect to the frame 12.

A control guide 50 is in communication with the panel 34. The control guide 50 is configured to follow contouring 72 on a face of a piece of guide trim 71 to restrict movement of the panel 34 and the cutting assembly 20 with respect to each other to allow the cutting assembly 20 to cope an ending 74 of the piece of wall trim 70. The control guide 50 includes a plate 51 that is attached to the upper support 14. The plate 51 has a lower edge 52, an upper edge 53, a rear face 54 and a front face 55 with the front face 55 facing the panel 34. The front face 55 lies in a plane orientated parallel to the axis of rotation axis of the saw blade 21. The guide trim 71 is positionable on the front face 55 and the contouring 72 of the guide trim 71 is directed toward the panel 34. The plate 51 is pivotal with respect to the panel 34 to allow the upper edge 53 to be moved toward or away from the panel 34. The plate 51 may be locked into place with a locking screw 56. Typically, an angle formed by the upper surface 35 and the front face 55 is greater than 100° and more typically the angle is between approximately 115° and 125°.

An angle guide 57 may be mounted to the upper support 14 to indicate an angle of the front face 55 with respect to a plane of the upper surface 35. The angle guide 57 is not shown in FIG. 5 for clarity purposes. This will ensure repeatability of cuts as well as determining pre-set angles. The ability to angle to the plate 51 will ensure that that the curvature, or radius, of the saw blade 21 will be taken into account. By angling the plate 51 more, the control guide 50 will be moved a greater distance as it follow the contouring 72, which in turn will lead to deeper cuts in the wall trim 70. It has been found that if the plate 51 is not angled, the apparatus 10 will function, however thicker areas of wall trim 70 will not align as well as thinner areas.

Figure 5:
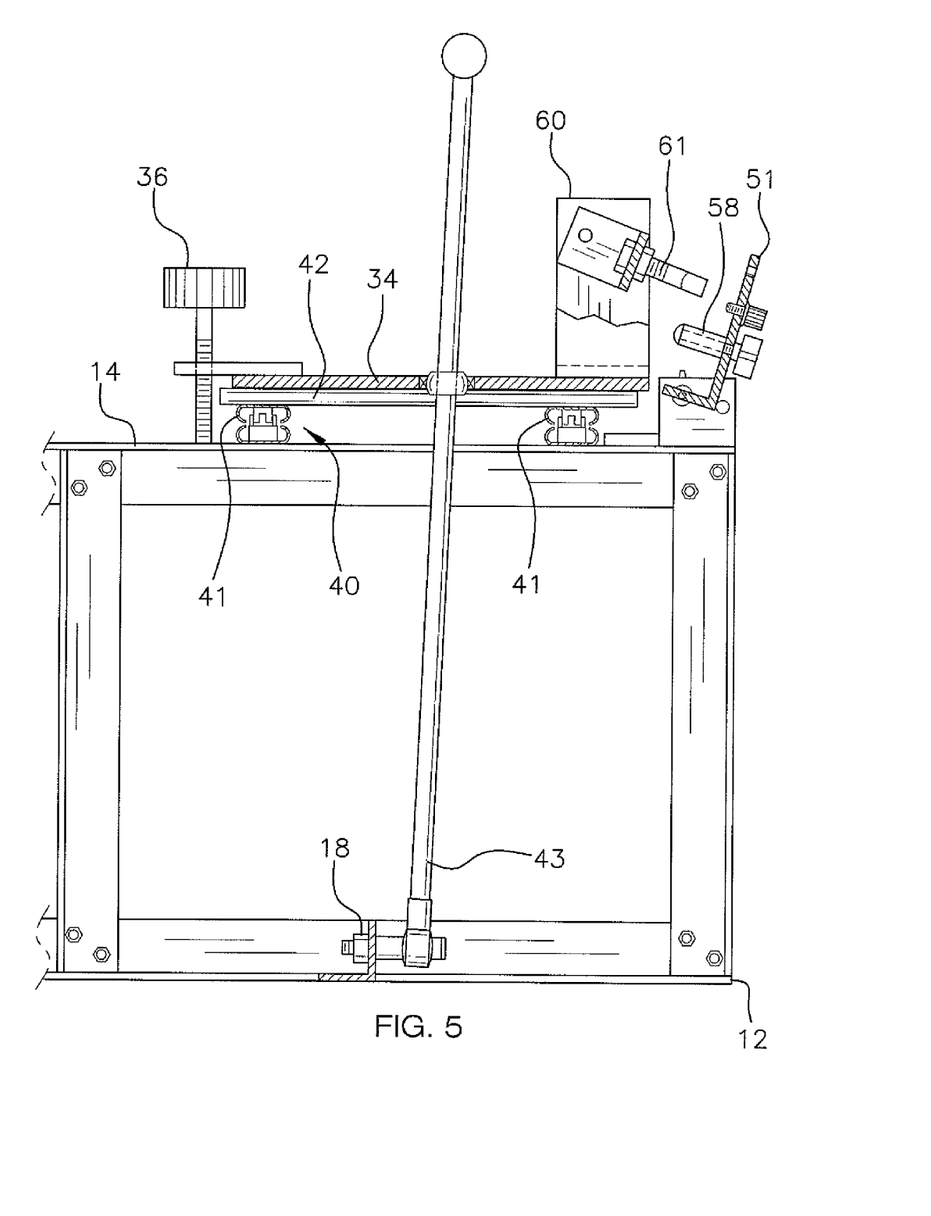
FIG. 5 is a cross-sectional view of an embodiment of the disclosure taken along line 5-5 of FIG. 4.

A stop 58 is mounted on the plate 51 and is abuttable against the guide trim 71 to restrict movement of the guide trim 71. The stop 58 is configured to be movable on the front face 55. As shown in FIG. 5, in particular, a plurality of stops 58 may be used and if needed placed on opposite ends of the guide trim 71. In general, the wall trim 71 will be placed adjacent to the saw blade 21 and then the stop 58 adjusted to position the guide trim 71 to a location where its contouring 72 will begin to be engaged.

The control guide 50 further includes an engagement member 59 that is configured to engage and follow the contouring 72 of the face of the guide trim 71. The engagement member 59 is mounted on the panel 34 and includes a docking member 60 attached to and extending upwardly from the upper surface 35. A rod 61 is attached to the docking member 60 and extends toward the plate 51. The rod 61 has a free end 62 that is configured to be movable across the contouring 72. The rod 61 is movable toward or away from the front face 55 and is also pivotable with respect to the docking member 60 to allow the free end 62 to be vertically lifted or lowered. The rod 61 may be comprised of a low friction material such as metal, plastic or silicone and may have a rounded free end 62.

A clamp 63 is mounted on the panel 34 and the clamp 63 is configured to retain the wall trim 70 in abutment with the upper surface 35 and prevent the wall trim 70 from moving on the upper surface 35 while the wall trim 70 is being coped. The clamp 63 may comprise any conventional clamp that does not interfere with the movement of the panel 34. A trim brace 64 may be mounted to the upper surface 35 as well. The trim brace 64 is configured to restrict movement of the wall trim 70 on the upper surface 35 and in particular to prevent it from pivoting with respect to the upper surface 35. The wall trim 70 is abuttable against the trim brace 64 when the wall trim 70 is clamped to the panel 34 with the clamp 63. The trim brace 64 has an inner edge 65 abuttable against the wall trim 70. The inner edge 65 has a longitudinal axis that is orientated parallel to the upper surface 35. This allows the longitudinal axis of the inner edge 35 and the axis of rotation of the saw blade 21 to lie in planes that are parallel to each other. The trim brace 64 is pivotable to allow the inner edge to be angled between +5° and −5° from being perpendicular with the axis of rotation of the saw blade. The ability to slightly angle the trim brace 64 allows for taking into account dwelling walls 78 which are not true. The trim brace 64 may be pivotable by loosening a bolt 66 which extending through an elongated slot 67 in the trim brace 64. The bolt 66 extends into the panel 34 and the trim brace 64 may be pivoted along the slot 67 to a selected angle.

Figure 9:
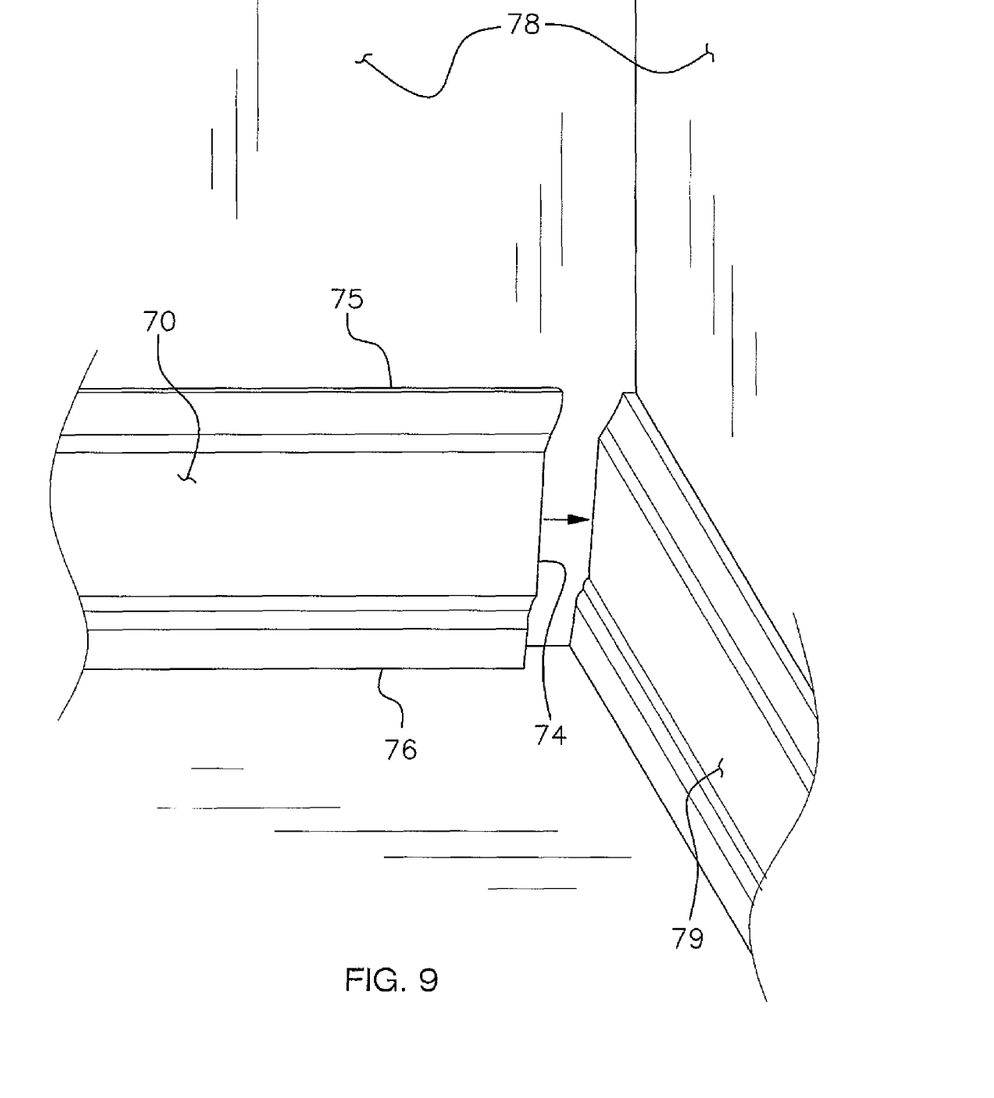
FIG. 9 is a perspective view of an embodiment of the disclosure depicting coped trimming.

In use, the guide trim 71 is placed on the plate 51 as described above and the rod 61 is adjusted to ensure that it will follow all edges of the contouring 72. It should be understood that the guide trim 71 and wall trim 70 will be cut from like pieces of trim having the same contours. The plate 51 may be adjusted as needed to a proper angle. The wall trim 70 is clamped into place with the clamp 63 and adjusted so that a sufficient enough portion of the wall trim 70 will be cut to account for the depth of the deepest contours. The cutting assembly 20 is turned on and the wall trim 70 is moved into the saw blade 21 so that the saw blade 21 cuts the wall trim 70 from its upper edge 75 to its lower edge 76 (or vice versa). The movements of a free end 74 of the wall trim 70, or the end that is being removed, will be along a line orientated parallel to the axis of rotation of the saw blade 21. In this manner, it will be the teeth 27 on the opposed faces 28, 29 which cut the wall trim 70. The wall trim 70 is also moved toward or away from the saw blade 21 in response to the rod 61 moving along the contouring 72. The free end 74 of the wall trim 70 will be coped so that it can then be abutted against another piece of trim, as shown in FIG. 9, already mounted on a wall 78 with the free end 74 matching the contouring 79 of the trim already mounted on the wall.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A cutting apparatus configured for coping a piece of wall trim, said apparatus including:
    a support frame including an upper support and a plurality of legs being attached to and extending downwardly from said upper support;
    a cutting assembly including a saw blade and motor for rotating said saw blade, said saw blade being a circular saw blade;
    a panel being mounted to said support frame, said panel having a planar upper surface, said saw blade extending above and below said upper surface, said panel and said cutting assembly being movable with respect to each other to allow a portion of the wall trim extending over an edge of said panel to be cut by said saw blade;
    a control guide being in communication with said panel, said control guide being configured to follow contouring on a face of a piece of guide trim to restrict movement of said panel and said cutting assembly with respect to each other to allow said cutting assembly to cope an ending of the piece of wall trim;
    said cutting assembly being configured to be raised or lowered with respect to said upper support;
    said saw blade having an axis of rotation orientated parallel to a plane of said upper surface;
    a mounting coupling said panel to said upper support, said mounting allowing movement of panel toward or away from said cutting assembly to define an x-movement and laterally left or right of said cutting assembly to define a y-movement, said mounting including a first rail assembly and a second rail assembly coupled together and being positioned between and being attached to said upper support and said panel, one of said first and second rail assemblies allowing said x-movement of said panel and one of said first and second rail assemblies allowing said y-movement of said panel.

2. The apparatus according to claim 1, wherein said control guide includes:
    a plate being attached to said upper support, said plate having a lower edge, an upper edge, a rear face and a front face, said front face facing said panel, said front face lying in a plane orientated parallel to said axis of rotation of said saw blade, wherein the guide trim is positionable on said front face such that contouring of the guide trim is directed toward said panel;
    a stop being mounted on said plate, said stop being abuttable against the guide trim to restrict movement of said guide trim, said stop being configured to be movable on said front face;
    an engagement member being attached to said panel and being configured to engage and follow the contouring of the face of the guide trim.

3. The apparatus according to claim 2, wherein said engagement member includes a docking member being attached to and extending upwardly from said upper surface, a rod being attached to said docking member and extending toward said plate, said rod having a free end being configured to be movable across the face, said rod being movable toward or away from said front face, said rod being pivotable with respect to said docking member to allow said free end to be vertically lifted or lowered.

4. The apparatus according to claim 2, wherein said plate is pivotal with respect to said panel to allow said upper edge to be moved toward or away from said panel, an angle formed by said upper surface and said front face being greater than 100°.

5. The apparatus according to claim 4, further including an angle guide being mounted to said upper support and indicating an angle of said front face with respect to a plane of said upper surface of said panel.

6. The apparatus according to claim 1, further including a clamp being mounted on said panel, said clamp being configured to retain the wall trim in abutment with said upper surface and prevent the wall trim from moving on said upper surface while the wall trim is being coped.

7. The apparatus according to claim 6, further including a trim brace being mounted to said upper surface, said trim brace being configured to restrict movement of the wall trim on said upper surface, wherein the wall trim is abuttable against said trim brace when the wall trim is clamped to said panel with said clamp.

8. The apparatus according to claim 7, said trim brace having an inner edge abuttable against the wall trim, said inner edge having a longitudinal axis being orientated parallel to said upper surface, said trim brace being pivotable to allow said inner edge to be angled between +5° and −5° from being perpendicular with said axis of rotation of the saw blade.

9. The apparatus according to claim 1, further including a handle engaging said panel to facilitate movement of said panel with respect to said cutting assembly.

10. A cutting apparatus configured for coping a piece of wall trim, said apparatus including:
    a support frame including an upper support and a plurality of legs being attached to and extending downwardly from said upper support;
    a cutting assembly including a saw blade and motor for rotating said saw blade, said saw blade being a circular saw blade, said cutting assembly being configured to be raised or lowered with respect to said upper support, said cutting assembly being electrically powered, an actuator being electrically coupled to said cutting assembly to selectively turn said cutting assembly on or off;
    a panel being mounted to said support frame, said panel having a planar upper surface, said saw blade extending above and below said upper surface, said panel and said cutting assembly being movable with respect to each other to allow a portion of the wall trim extending over an edge of said panel to be cut by said saw blade, said saw blade having an axis of rotation orientated parallel to a plane of said upper surface;
    a mounting coupling said panel to said upper support, said mounting allowing movement of panel toward or away from said cutting assembly to define an x-movement and laterally left or right of said cutting assembly to define a y-movement, said mounting including a first rail assembly and a second rail assembly coupled together and being positioned between and being attached to said upper support and said panel, one of said first and second rail assemblies allowing said x-movement of said panel and one of said first and second rail assemblies allowing said y-movement of said panel;

a control guide being in communication with said panel, said control guide being configured to follow contouring on a face of a piece of guide trim to restrict movement of said panel and said cutting assembly with respect to each other to allow said cutting assembly to cope an ending of the piece of wall trim, said control guide including;

a plate being attached to said upper support, said plate having a lower edge, an upper edge, a rear face and a front face, said front face facing said panel, said front face lying in a plane orientated parallel to said axis of rotation axis of said saw blade, wherein the guide trim is positionable on said front face such that contouring of the guide trim is directed toward said panel, said plate being pivotal with respect to said panel to allow said upper edge to be moved toward or away from said panel, an angle formed by said upper surface and said front face being greater than 100°;

a stop being mounted on said plate, said stop being abuttable against the guide trim to restrict movement of said guide trim, said stop being configured to be movable on said front face;

an engagement member being configured to engage and follow the contouring of the face of the guide trim, said engagement member being mounted on said panel and including a docking member being attached to and extending upwardly from said upper surface, a rod being attached to said docking member and extending toward said plate, said rod having a free end being configured to be movable across the face, said rod being movable toward or away from said front face, said rod being pivotable with respect to said docking member to allow said free end to be vertically lifted or lowered;

an angle guide being mounted to said upper support and indicating an angle of said front face with respect to a plane of said upper surface of said panel;

a clamp being mounted on said panel, said clamp being configured to retain the wall trim in abutment with said upper surface and prevent the wall trim from moving on said upper surface while the wall trim is being coped;

a trim brace being mounted to said upper surface, said trim brace being configured to restrict movement of the wall trim on said upper surface, wherein the wall trim is abuttable against said trim brace when the wall trim is clamped to said panel with said clamp, said trim brace having an inner edge abuttable against the wall trim, said inner edge having a longitudinal axis being orientated parallel to said upper surface, said trim brace being pivotable to allow said inner edge to be angled between +5° and −5° from being perpendicular with said axis of rotation of the saw blade; and a handle engaging said panel to facilitate movement of said panel with respect to said cutting assembly.

11. A cutting apparatus configured for coping a piece of wall trim, said apparatus including:

a support frame including an upper support and a plurality of legs being attached to and extending downwardly from said upper support;

a cutting assembly including a saw blade and motor for rotating said saw blade, said saw blade being a circular saw blade;

a panel being mounted to said support frame, said panel having a planar upper surface, said saw blade extending above and below said upper surface, said panel and said cutting assembly being movable with respect to each other to allow a portion of the wall trim extending over an edge of said panel to be cut by said saw blade; and a control guide being in communication with said panel, said control guide being configured to follow contouring on a face of a piece of guide trim to restrict movement of said panel and said cutting assembly with respect to each other to allow said cutting assembly to cope an ending of the piece of wall trim;

said cutting assembly being configured to be raised or lowered with respect to said upper support;

said saw blade having an axis of rotation orientated parallel to a plane of said upper surface;

a mounting coupling said panel to said upper support, said mounting allowing movement of panel toward or away from said cutting assembly to define an x-movement and laterally left or right of said cutting assembly to define a y-movement; and a handle engaging said panel to facilitate movement of said panel with respect to said cutting assembly.

12. The apparatus according to claim 11, wherein said control guide includes:

a plate being attached to said upper support, said plate having a lower edge, an upper edge, a rear face and a front face, said front face facing said panel, said front face lying in a plane orientated parallel to said axis of rotation of said saw blade, wherein the guide trim is positionable on said front face such that contouring of the guide trim is directed toward said panel;

a stop being mounted on said plate, said stop being abuttable against the guide trim to restrict movement of said guide trim, said stop being configured to be movable on said front face;

an engagement member being attached to said panel and being configured to engage and follow the contouring of the face of the guide trim.

13. The apparatus according to claim 12, wherein said engagement member includes a docking member being attached to and extending upwardly from said upper surface, a rod being attached to said docking member and extending toward said plate, said rod having a free end being configured to be movable across the face, said rod being movable toward or away from said front face, said rod being pivotable with respect to said docking member to allow said free end to be vertically lifted or lowered.

14. The apparatus according to claim 12, wherein said plate is pivotal with respect to said panel to allow said upper edge to be moved toward or away from said panel, an angle formed by said upper surface and said front face being greater than 100°.

15. The apparatus according to claim 14, further including an angle guide being mounted to said upper support and indicating an angle of said front face with respect to a plane of said upper surface of said panel.

16. The apparatus according to claim 11, further including a clamp being mounted on said panel, said clamp being configured to retain the wall trim in abutment with said upper surface and prevent the wall trim from moving on said upper surface while the wall trim is being coped.

17. The apparatus according to claim 16, further including a trim brace being mounted to said upper surface, said trim brace being configured to restrict movement of the wall trim on said upper surface, wherein the wall trim is abuttable against said trim brace when the wall trim is clamped to said panel with said clamp.

18. The apparatus according to claim 17, said trim brace having an inner edge abuttable against the wall trim, said inner edge having a longitudinal axis being orientated parallel to said upper surface, said trim brace being pivotable to allow said inner edge to be angled between +5° and −5° from being perpendicular with said axis of rotation of the saw blade.

* * * * *